(12) United States Patent
Barato et al.

(10) Patent No.: US 12,378,005 B2
(45) Date of Patent: Aug. 5, 2025

(54) CASING OF AN AIRCRAFT

(71) Applicant: Technology for Propulsion and Innovation S.p.A., Padua (IT)

(72) Inventors: Francesco Barato, Padua (IT); Daniele Pavarin, Padua (IT)

(73) Assignee: TECHNOLOGY FOR PROPULSION AND INNOVATION S.P.A., Padua (IT)

( * ) Notice: Subject to any disclaimer, the term of this patent is extended or adjusted under 35 U.S.C. 154(b) by 0 days.

(21) Appl. No.: 17/780,829

(22) PCT Filed: Nov. 27, 2020

(86) PCT No.: PCT/IB2020/061225
§ 371 (c)(1),
(2) Date: May 27, 2022

(87) PCT Pub. No.: WO2021/105949
PCT Pub. Date: Jun. 3, 2021

(65) Prior Publication Data
US 2022/0411041 A1     Dec. 29, 2022

(30) Foreign Application Priority Data
Nov. 28, 2019   (IT) .................. 102019000022431

(51) Int. Cl.
*B64G 1/00*     (2006.01)
*B64C 7/00*     (2006.01)

(52) U.S. Cl.
CPC ............. *B64G 1/005* (2013.01); *B64C 7/00* (2013.01)

(58) Field of Classification Search
CPC . B64D 1/12; B64D 1/062; B64D 5/00; B64G 1/005
See application file for complete search history.

(56) References Cited

U.S. PATENT DOCUMENTS

| 4,601,444 A * | 7/1986 | Lindenbaum ............. B64B 1/24 244/26 |
| 4,901,949 A | 2/1990 | Elias |
| 6,237,795 B1 * | 5/2001 | Buckley ................. B64G 1/641 206/521 |
| 7,458,544 B1 | 12/2008 | Sarigul-Klijn et al. |
| 2005/0204910 A1 * | 9/2005 | Padan ..................... B64D 1/04 89/1.813 |

(Continued)

FOREIGN PATENT DOCUMENTS

WO    2003097453 A2    11/2003

OTHER PUBLICATIONS

"F-16 Fighting Falcon." Air Force, archived on Sep. 1, 2019 at Internet Archives, https://web.archive.org/web/20190615000000*/https://www.af.mil/About-Us/Fact-Sheets/Display/Article/104505/f-16-fighting-falcon/ (Year: 2019).*

(Continued)

*Primary Examiner* — Joshua J Michener
*Assistant Examiner* — Ka Chun Leung
(74) *Attorney, Agent, or Firm* — Tutunjian & Bitetto, P.C.

(57) ABSTRACT

The present invention relates to a casing intended to be externally applied, connected or fixed to the fuselage or to a wing of an aircraft or to a central or wing station/hardpoint of an aircraft, the casing entirely or partly delimiting a housing zone (HZ) of a super-orbital, orbital or sub-orbital launch vehicle.

17 Claims, 6 Drawing Sheets

(56) References Cited

U.S. PATENT DOCUMENTS

| | | | |
|---|---|---|---|
| 2007/0205327 A1 | 9/2007 | Gioffre et al. | |
| 2010/0187352 A1* | 7/2010 | Yavilevich | B64D 37/04 244/45 R |
| 2013/0221158 A1 | 8/2013 | Binkholder et al. | |
| 2014/0319281 A1* | 10/2014 | Helou, Jr. | B64G 1/22 244/171.1 |
| 2015/0284080 A1 | 10/2015 | Facciano et al. | |
| 2016/0031571 A1* | 2/2016 | Ball | B64G 1/402 244/171.1 |
| 2016/0039521 A1* | 2/2016 | London | B64D 7/08 244/2 |
| 2017/0129626 A1* | 5/2017 | Bryan | B64G 1/14 |
| 2018/0002013 A1* | 1/2018 | McCullough | B64C 39/06 |

OTHER PUBLICATIONS

"Aerospaceweb.org | Ask Us—Concorde History III." Aerospaceweb. org, archivhed on Mar. 2, 2019 at Internet Archives, https://web.archive.org/web/20190302234450/https://aerospaceweb.org/question/planes/q0199a.shtml (Year: 2019).*

"Aircraft Operating Environment." National Research Council. 1996. Accelerated Aging of Materials and Structures: The Effects of Long-Term Elevated-Temperature Exposure, https://nap.nationalacademies.org/read/9251/chapter/4 (Year: 1996).*

"Orbital Station-keeping." Wikipedia, the Free Encyclopedia, archived on Jul. 15, 2019 at Internet Archive at https://web.archive.org/web/20190715002144/https://en.wikipedia.org/wiki/Orbital_station-keeping (Year: 2019).*

International Search Report for PCT/IB2020/061225 dated Mar. 1, 2021 (2 pages).

* cited by examiner

CASING OF AN AIRCRAFT

TECHNICAL FIELD OF THE INVENTION

The present invention relates to a casing intended to be applied externally to an aircraft as well as an aircraft equipped with such a casing for containing a launch vehicle, in particular a super-orbital, orbital or sub-orbital launch vehicle.

STATE OF THE PRIOR ART

When a launch vehicle is air-transported, it can be inserted inside an aircraft or mounted externally to the latter.

In the first case, the launch vehicle is protected before launch by the surrounding environment defined by the aircraft's nacelle, but the release is complex, because it can interfere with the fuselage hatch, damaging the latter or being damaged if it is partially wedged out.

This would result in a displacement of the center of gravity of the aircraft outside the permissible limits and, in the case of launch vehicles based on liquid propellants, can cause contamination of the interior of the aircraft, with consequent risks of fire or explosion.

The external air-transported configuration, as reported for example in patents U.S. Pat. No. 4,901,949 or 7,458,544, is instead free from these problems, but it has the following problems.

First of all, the launch vehicle during all transport is exposed to the effect of the external environment, which mainly translates into the need for it to operate in an extremely wide range of temperatures, even down to −50° C., with consequent complexities depending upon the type of launch system.

Moreover, it is possible that an impact may occur with external objects, debris on the runway, birds, which could damage the launch vehicle.

It is then necessary to qualify or protect the launch vehicle from lightning.

It should also be taken into account that in the event of landing without a gear, the launch vehicle must first be detached from the aircraft with consequent loss of the launch vehicle itself in order not to interfere with the landing dynamics.

There is also a high sensitivity to weather conditions (hail) which could restrict the flight envelope.

Finally, in accordance with the external air-transported configuration, it is necessary to design the launch system to withstand the loads connected to the flight configuration and linked in particular to the presence of the fixing pylons and to the dynamics of the aerial platform which may involve a considerable increase in terms of inert mass of the air-transported system.

SUMMARY OF THE INVENTION

An object of the present invention is to provide a solution to the problem of transporting launch vehicles on aerial platforms, i.e. systems for accessing super-orbital, orbital and sub-orbital space.

Another object of the present invention is to provide a solution that allows super orbital, orbital and sub-orbital launch vehicles to be transported in a protected manner on an aircraft, substantially reducing the effect of external conditions such as for example the meteorological ones.

Another object of the present invention is to provide a solution as indicated above which ensures the transport of a launch vehicle on an aircraft under specific thermal conditions.

Another object of the present invention is to provide a solution as indicated above which allows a super-orbital, orbital or sub-orbital launch vehicle to be transported externally to an aircraft, substantially reducing the thermomechanical stresses to which the launch vehicle is subjected.

Another object of the present invention is to provide a solution that allows the transport on aerial platforms of super-orbital, orbital or sub-orbital launch apparatuses without the need to provide on the launch vehicles themselves interfaces (e.g. mechanical) depending upon the type of aerial platform.

Other features and advantages of the invention will be more evident from the description of embodiments of a casing and aircraft, illustrated as an indication in the accompanying drawings in which.

In the accompanying drawings identical parts or components are indicated by the same reference numbers.

DETAILED DESCRIPTION OF THE INVENTION

With reference to the enclosed figures, a casing is shown intended to be externally applied, connected or fixed to the fuselage 2a or to a wing 2b of an aircraft 2, such as airplane or glider entirely or partly delimiting a housing zone HZ of a launch vehicle 3.

The casing is preferably constrained or anchored at the wing hardpoints or at a central hardpoint 6 of an aircraft.

In this text, "fuselage" means the main body part of an aircraft or airplane that contains passengers and/or cargo, depending on the type of aircraft. The fuselage can also house an engine or a tank inside, if required.

With "launch vehicle", as it is known, it is to be intended a vehicle, such as a carrier rocket, propelled by a special type of engines, indicated as rockets or rocket engines, which vehicle is the means used to send for example in the space a given payload, which can include astronauts, satellites, interplanetary probes, refueling modules for orbiting space bases, etc.

A launch vehicle according to the present invention can of course be of the super orbital, orbital or sub orbital type, depending on whether it is designed to reach and then operate outside the Earth's orbit, on the Earth's orbit or within the zone defined by the Earth's orbit.

Figure 15:
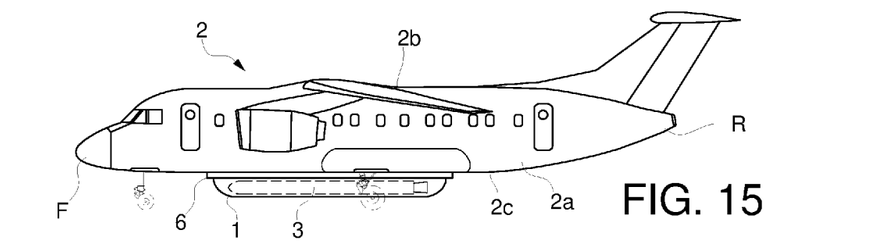
FIGS. 15 to 17 are side, bottom and from a side views, respectively, of an aircraft according to the present invention.
Figure 16:
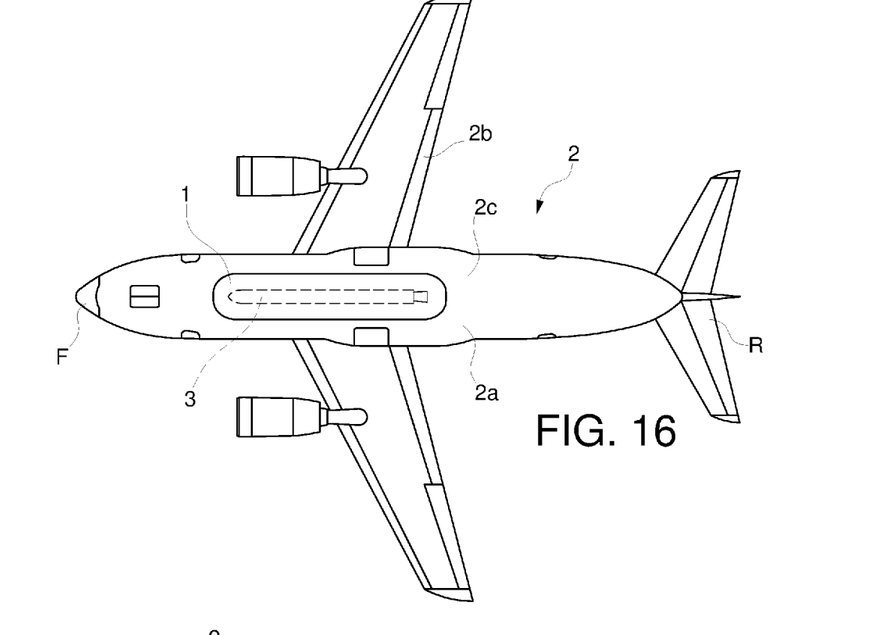
Figure 17:
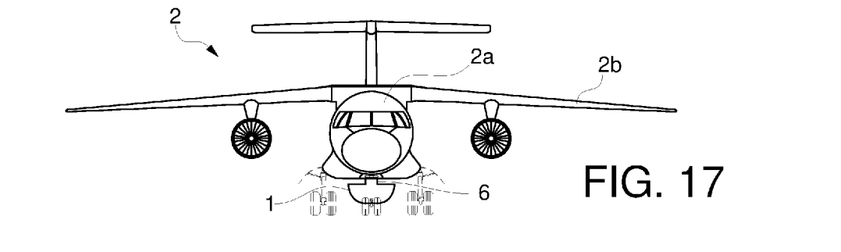

Preferably, the housing zone HZ is defined, in use, entirely between the casing 1 and a respective section of the outer wall of the fuselage 2a of the aircraft 2 or of a wing 2b or of a wing or central hardpoint 6, whereby the casing 1 is in fact open at one of its ends or edges 1a, for example annular and, in use, upper (see FIGS. 15, 16 and 17) or lower (see FIG. 14), which end or edge is fixed, for example welded or glued or pivoted to the aircraft 2 or better to a wing or central hardpoint 6 of the same.

In this regard, preferably the casing 1 is connected by means of a coupling and release mechanism to a wing or central hardpoint 6, which is fixed, if desired glued or mechanically connected, for example by means of fitting or forced insertion of parts, to an aircraft 2 or to a part of the fuselage 2a thereof.

The wing or central hardpoint 6 is in this case constrained, if desired also welded, glued or otherwise bound to the fuselage 2a of the aircraft 2 or to a wing 2b of the latter.

The wing or central hardpoint 6 is a rigid structural element, which, if desired, is faired.

An interface for the data and for the activation of opening and closing of the casing 1 or of a respective component 1c is also preferably provided in the casing.

Alternatively, the casing 1 is substantially closed or closable and constrainable, externally to the housing area HZ, to the aircraft 2, in which case the housing area HZ is defined entirely by the casing 1.

Subject-matter of the present invention is also an aircraft 2 provided with a main frame or fuselage 2a, with at least one wing 2b and at least one casing 1 according to the present invention as well as, if desired, with one or more launch vehicles 3 in each casing 1

In such an aircraft 2, the casing 1 is mounted externally to the main frame or fuselage 2a or to a wing 2b and contains or is designed to contain a launch vehicle 3 outside the frame 2a of the aircraft 2, so as to protect the launch vehicle 3 during an entire flight phase of the aircraft itself.

Basically, the casing 1 is not a component of the fuselage or main frame 2a of the aircraft 2, but it constitutes an external element that is bound externally to the aircraft 2 or better to a wing or central hardpoint 6 of the same.

The casing 1 is designed to protect the launch vehicle 3 during an entire flight phase of a respective aircraft 2.

The casing 1 can be made in any suitable way, for example with a curved wall or with a plurality of walls inclined to each other. It can be applied, connected or fixed to an aircraft 2 in any suitable way, for example pivoted or even partially welded or glued or even by inserting one or more of its parts in special guides defined by the aircraft 2 or by a respective wing or central hardpoint 6 or by fitting, forced insertion, snap engagement or bayonet engagement of respective portions of casing 1 and aircraft 2 or by any other suitable method.

Figure 18:
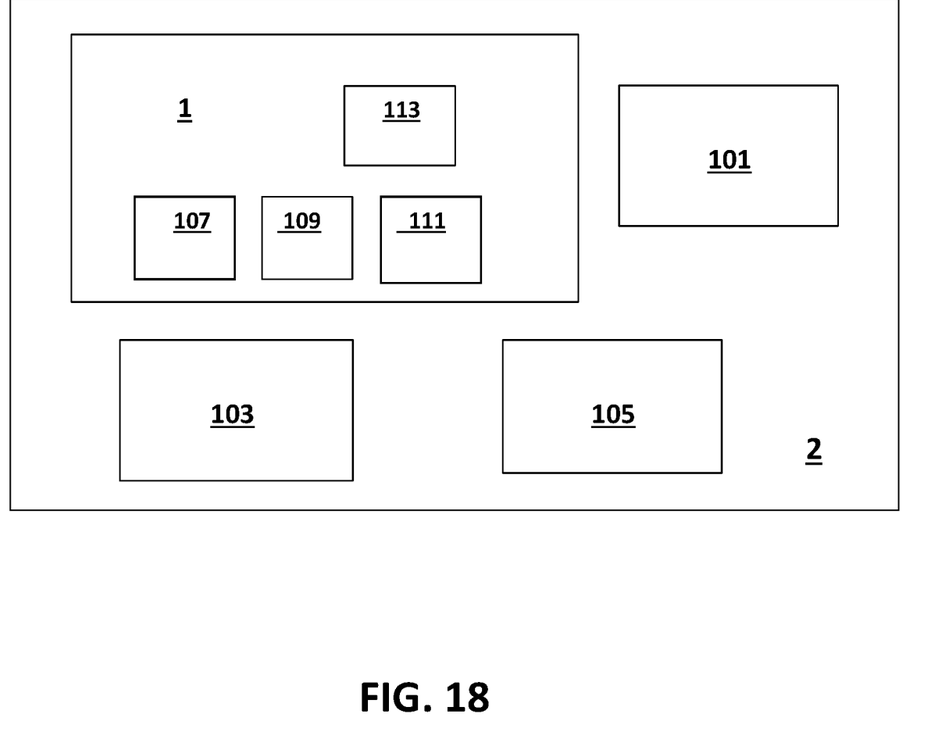
FIG. 18 is an exemplary schematic diagram of an aircraft including a heat-regulation means and a heater/cooler, and other features according to the present invention.

Advantageously, the casing 1 includes heat-regulation means 101 set to ensure a thermally stable and controlled environment in the housing zone HZ. Clearly, the heat-regulation means 101 can be fixed to the aircraft 2, but leading to or acting in the housing zone HZ.

The heat-regulation means 101 can comprise a sensor 103 designed to directly or indirectly detect the temperature in the housing area HZ and a heater and/or a cooler 105 to adjust the temperature in the latter according to requirements or according to the data detected by the sensor 103.

Preferably, a first electronic connection data interface is provided between the launch vehicle 3 and the casing 1. Even more preferably, a second electronic connection data interface is provided between the casing 1 and the aircraft 2.

As indicated above, the casing 1 is preferably bound or connected to a wing or central hardpoint 6 through an anchoring mechanism, which is therefore a mechanical interface. In this interface, a special data interface can be provided or housed for the passage of data to activate any motor or monitor any sensors in the casing. The data interface may include, for example, a USB socket.

If desired, special means for the passage or transfer of electrical power to power one or more possible heaters, sensors, motors, actuators will also be provided in the anchoring mechanism. These means may include an electrical interface, such as a plug.

Preferably, the casing 1 is made of materials such as to deform externally and to resist internally so as to protect the launch vehicle 3 even in the event of landing without a landing gear allowing the aircraft 2, such as an airplane, to land on its belly or on the respective lower part 2c without the need to unload the launch vehicle in advance 3.

The casing 1 can also be provided with control means 107, such as a pressure, temperature and/or environmental humidity sensor in the housing zone HZ. The casing 1 could then be equipped with sensors to connect it to the launch vehicle 3 to monitor the status of the latter. Clearly, the control means could also be fixed to the aircraft 2, but leading or acting in the housing zone HZ.

If desired, the casing 1 or an aircraft is provided with a system for releasing a launch vehicle 3 located within the housing zone HZ.

Such release system includes means 1b, 1c for closing-opening the housing zone HZ, a button or command means or electronic control unit for the opening-closing of the opening-closing means as well as one or more motors for actuating the closing-opening means 1b, 1c, so as to allow the opening or closing of the housing zone HZ according to the needs, for example an opening step during flight. The button or command means or electronic control unit is preferably on board the aircraft 2 or remotely operated, if desired from a control base.

According to a variant, the opening of the release system or of the respective opening-closing means could also take place or be controlled by gravity or by the action of springs or elastic elements and thus not necessarily through motors.

The closing-opening means 1b, 1c can comprise doors of bomb-bay type, panels placed in the direction of the wind or counter-wind, single or multiple panels, detachable panels or panels which remain fixed to the aircraft and reclose the casing after the launch.

Basically, the casing 1 could have a part that can be fixed 1b, by welding or other way to the aircraft 2 or better to the fuselage 2a of the aircraft 2 and one or more doors or hatches 1c mounted movable with respect to the fixable part 1b.

The fixable part 1b could be for example annular and, if desired, with a curved extension defining a free section tapered away from the aircraft 2 or from a respective section of the fuselage of the latter. The fastening end or edge 1a of the casing 1 to the aircraft 2 preferably constitutes an end or edge 1a of the fixable part 1b, this in particular when the casing 1 defines the housing zone together with a wall or section of wall of the fuselage 2a or wings 2b of an aircraft.

Figure 4:
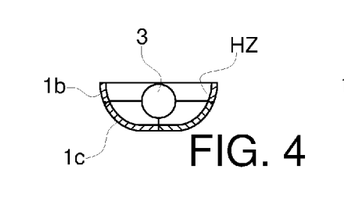
FIG. 4 is a cross-section view of the casing of FIG. 1 with a launch vehicle.
Figure 5:
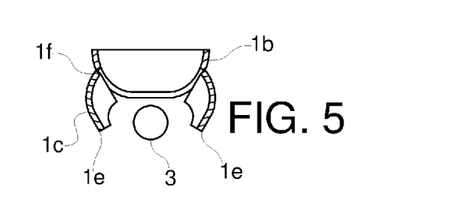
FIG. 5 is a view of the casing of FIG. 4 in the open condition of release of the launch vehicle.
Figures 9, 10:
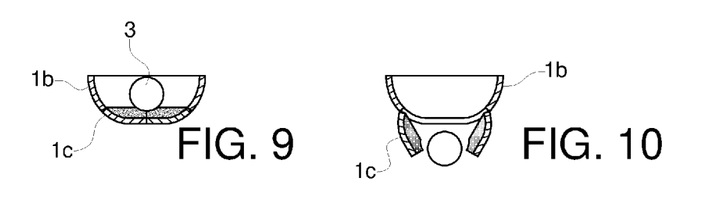

The hatch(s) 1c could be hinged to the fixable part 1b, for example at a lower section or end 1 of the latter, so that by commanding the opening of the hatches 1c, the launch vehicle is released downwards or falls. In this case, two movable doors 1c could be provided, hinged at their own distal end and with free end 1e proximal and movable between a closed position, in which the free ends 1e are adjacent to each other (see FIGS. 4 and 9) and an opening or release position of the launch vehicle 3, in which the respective free ends 1e are moved apart and are further lowered (see FIGS. 5 and 10) relative to the respective pivoting end 1f.

The release means can alternatively be designed to release a launch vehicle 3 with a trim different than that of the aircraft 2 owing to a rotation in the release phase of the launch vehicle 3 with respect to the casing during the release phase.

Thus, for example, the casing 1 or a part thereof 1c can be pivoted in whole or in part to the aircraft 2 or to another component 1b of the casing 1. In this regard, a front or rear pivot axis could be provided.

Figure 11:
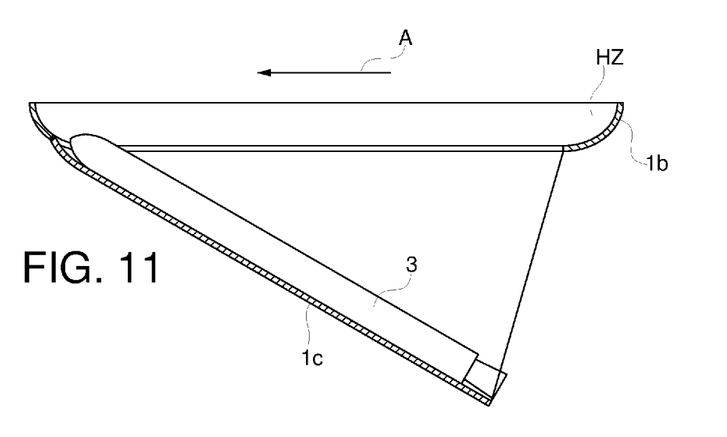
FIGS. 11 and 12 show embodiments of a casing during the release of a respective launch vehicle.

According to the non-limiting embodiment shown in FIG. 11, a hatch 1c is provided hinged at one front end (i.e. closer, in use or after assembly, to the tip or front F of the aircraft 2 with respect to the other end) of the fixable part 1b, whereby by activating the opening/closing means, by means of a respective motor, the inclination or angular displacement of the casing 1 or better of the respective hatch 1c is caused, thereby making it possible the launch vehicle 3 to come out in the direction of the rear R of the aircraft 2, more particularly owing to a sliding the launch vehicle 3 and releasing it in a direction from the front F to the rear R of the aircraft 2.

As indicated above, hydraulic, spring actuators or even a cable damped release of the hatch 1c could be provided, and thus a system not necessarily driven by a motor.

Moreover, a cable or tie rod 5 could also be provided extending between a free end of the hatch 1c and the fixable part 1b, designed to ensure proper support and constraint of the hatch 1c during the opening phase of the same.

Figure 12:
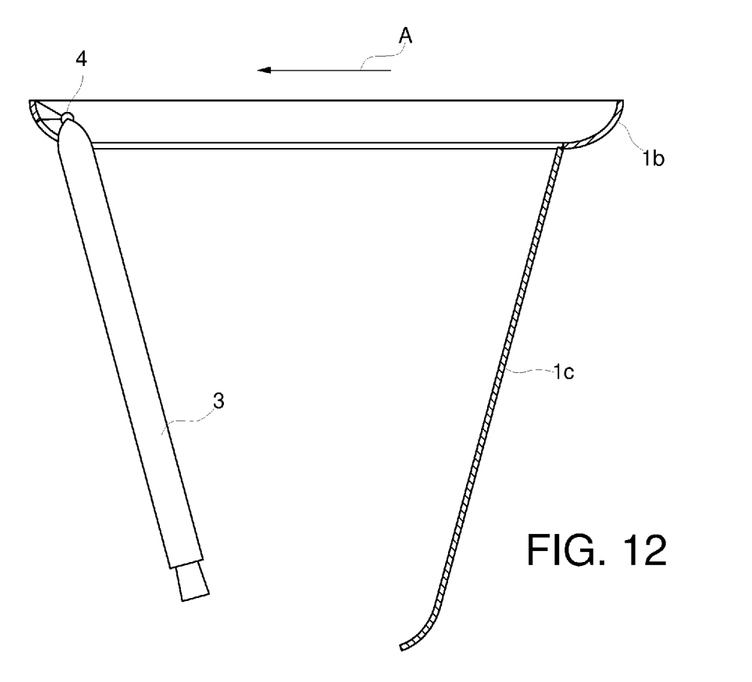

With regard to FIG. 12, a solution similar to the one described above has been instead shown, but in such solution an anchoring point or pin 4 of the hatch 1c is provided at one end, in use, front or rear of the casing 1, so that by opening the latter, an initial constraint or pivot point of the launch vehicle 3 and thus a substantially vertical release or by falling of the launch vehicle 3 itself is determined. Clearly, the constraint point or pin 4 can be fixed or integral with the aircraft 2, if desired with the fuselage 2a or wing 2b of the same, or with the casing 1, if desired with a part 1b of the same.

In FIGS. 11 and 12, for illustrative purposes, the direction of advancement of the aircraft 2 and therefore of the respective casing 1 is indicated by A.

As it will be understood, also means for removable anchoring of the launch vehicle 3 to the casing or even to a section of the aircraft 2 could be provided, which removable anchoring means are designed to keep the launch vehicle 3 during flight and to release it, if desired after a hatch 1c of the casing 1 has been opened or after opening or releasing the latter.

In this case, the removable anchoring means could be controlled by means of a pushbutton or command means or electronic control unit, for example on board the aircraft 2 or even remotely, if desired from a control base.

The casing 1 can also comprise support means 7a, 7b designed to minimize the loads induced by the flight or by the release of the launch vehicle 3. The support means 7a, 7b can include, for example, plate or tripod components mounted inside the casing 1 or on a surface, in use, internal 1g thereof, defining the respective housing zone HZ and, if desired, defining resting seats 7c, for example in recess for respective sections of the launch vehicle 3.

Figure 1:
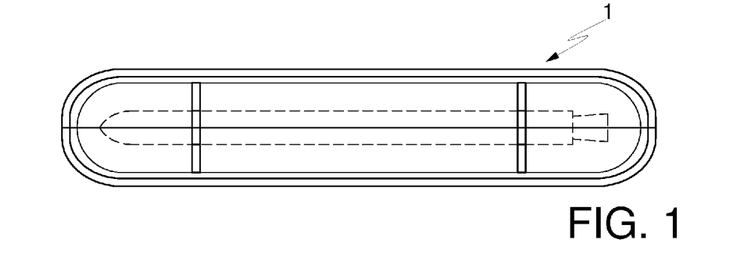
FIG. 1 is a bottom view of a casing according to the present invention with a launch vehicle.
Figures 2, 3:
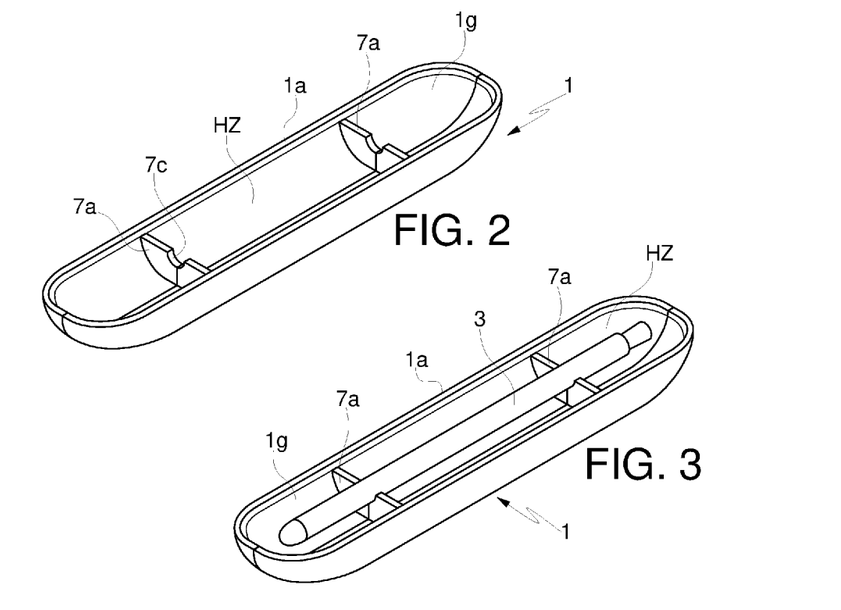
FIGS. 2 and 3 are perspective views slightly from above of a casing as indicated above without or with launch vehicle, respectively.

Thus, for example, two or more (see FIGS. 1 to 3) plate components 7a, which are suitably spaced, can be provided for supporting, in use, a front part and a rear part, respectively, of the launch vehicle 3.

Figure 6:
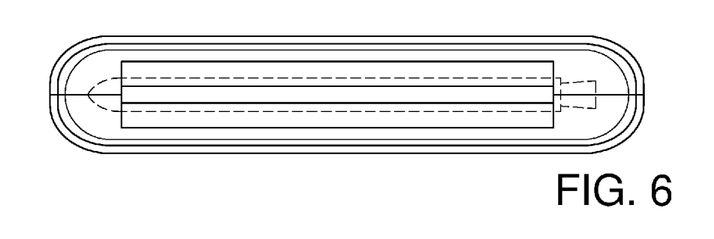
FIGS. 6 to 10 are views similar to FIGS. 1 to 5, respectively, of another embodiment according to the present invention.
Figures 7, 8:
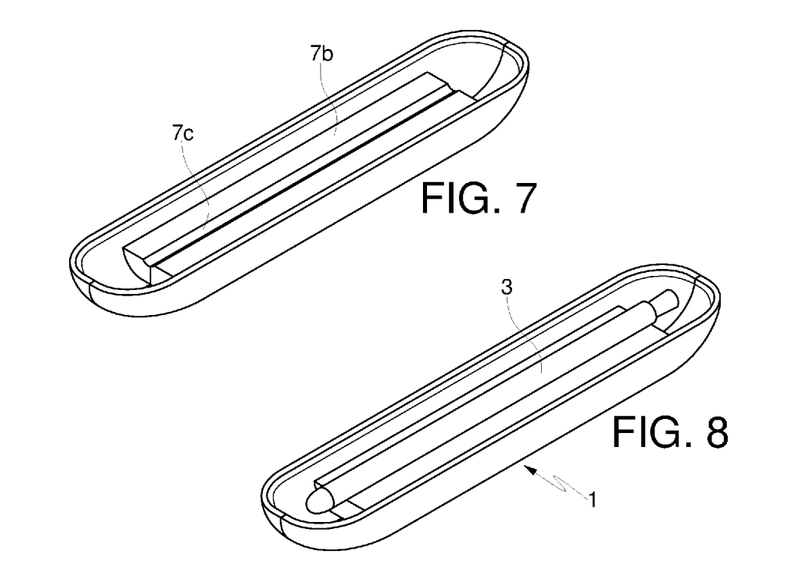

A single block component 7b can also be provided (see FIGS. 6 to 8) with a length corresponding to or slightly less than the launcher 3.

The support means could be of a continuous cradle-like type or discontinuous with section capable of minimizing the mechanical stresses of a stationary or dynamic nature transferred to the launch vehicle 3 during the take-off, landing or cruise steps of an aircraft.

The support means could be made in several parts or in a single piece able to achieve the above indicated purpose.

The support means could be made of material compatible with the fluids present inside the launch vehicle 3 in order to prevent any thermal phenomena resulting from the tapping of the propellant.

Preferably, the support means 7a, 7b are integral and movable with one or more hatches 1c of the casing, if this component is provided.

Moreover, support means of the launch vehicle 3 could also be provided following the opening of a hatch, for example a net or cables, which support means would be cut or broken in a step subsequent to the opening of the hatch.

If, for example, two hatches 1c are provided with a respective end 1e that can be removed for opening the housing zone HZ and releasing the launch vehicle, then the support means 7a, 7b will preferably have several parts, each part being integral with a respective hatch 1c and movable apart from each other so as to allow the launch vehicle 3 to be released or unfasten when the release system is operated.

Clearly, this expedient is not necessary, see for example the examples of FIGS. 11 and 12.

In this case, the launch vehicle 3 would be preferably only laying and not fixed to the support means 7.

These support means 7a, 7b can include supports made of plastic or rubber material or in any case material suitable for minimizing the loads transferred to the launch vehicle, if desired uniformly distributed along the lower surface of the housing zone HZ or distributed in sections along the housing zone HZ.

Clearly, the support means 7a, 7b do not protrude outside the housing zone HZ and, if provided, beyond the end or edge 1a.

The casing 1 could then be equipped with an appropriate fire-fighting system, and could be made of fireproof or self-extinguishing materials.

Figure 13:
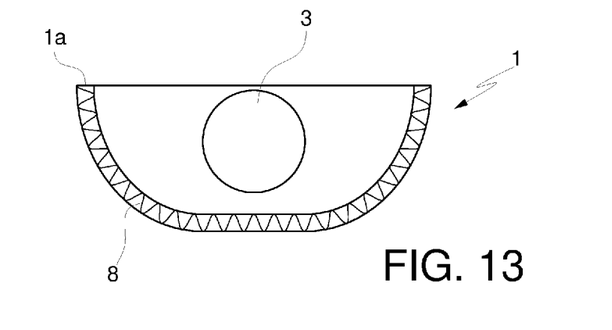
FIG. 13 shows a sectional front view of another casing according to the present invention.

Advantageously, the casing 1 is made or internally covered with suitable compressible material 8 (see FIG. 13), e.g. multi-layer, in order to absorb energy in the case of landing of an aircraft without landing gear, protecting the launch vehicle therein in case of failure to release. The compressible material may include polymeric or metal structures, such as foamed metal or polymeric, which deform by absorbing energy in the event of an impact.

The casing 1 is made with thickness suitable to support the thermomechanical loads connected to the transport of the launch system. The casing can be the same for different aircrafts with different interfaces or can be made ad-hoc for a specific aircraft.

The casing can be made with a closed structure, pressurized as needed and equipped with any holes protected or not by valves for overpressure compensation, or for internal or external pressure balancing or for the release of any fluids deriving from accidental tapping.

Advantageously, the casing 1 is also equipped with appropriate diagnostics to monitor the internal state of the launch vehicle 3 and any tapping, such as for example optical diagnostics, level sensors and/or fluid sensors.

At least one sensor can also be present for monitoring the state of a launch vehicle 3 contained in the housing zone HZ. Such sensor can be fixed to the casing 1 or to the aircraft 2.

Moreover, the casing could also have wings 109, as well as, if desired, a propulsion apparatus 111 for autonomous flight once released from an aircraft 2. To this regard, the casing could also have a parachute 113 for the flight or controlled fall once released and optionally also or as an alternative motors for an autonomous flight or for a controlled glide.

Preferably, the casing 1 is made internally of materials compatible with the propellants used for the detonation of the launch vehicle and is thus also insensitive to any phenomena of tapping of the propellant, following the breakage of some fluidic component of the launching system or of a tank.

The casing 1 is also adapted to protect the launch vehicle 3 contained therein from any external phenomenon such as for example rain, hail, snow, impact with external bodies of any nature, lightning and any other type of phenomenon that could compromise the integrity of the launch vehicle 3.

The launch vehicle 3 can possibly be released from the aircraft 2 in an emergency.

As far as the construction materials of the casing 1 are concerned, it can be made of any suitable material, for example metal, plastic, composite, ceramic or mixed material, if desired with fireproof protections.

Clearly, the casing 1 can be made with an aerodynamic shape designed to minimize the resistance to advancement and possibly intervene in a positive way on the lift of the aircraft 2.

Of course, the casing can be used on any type of aircraft 2, if desired with a single fuselage, double fuselage both below and above and in a configuration under the wing of an aircraft, as will be discussed later.

Moreover, the casing can also be equipped with an appropriate system for the release of the propellant on board the launch vehicle 3 in an emergency.

By aircraft according to the present invention it is meant, for example, aircrafts for transporting people, cargo, tankers or combat aircrafts.

Figure 14:
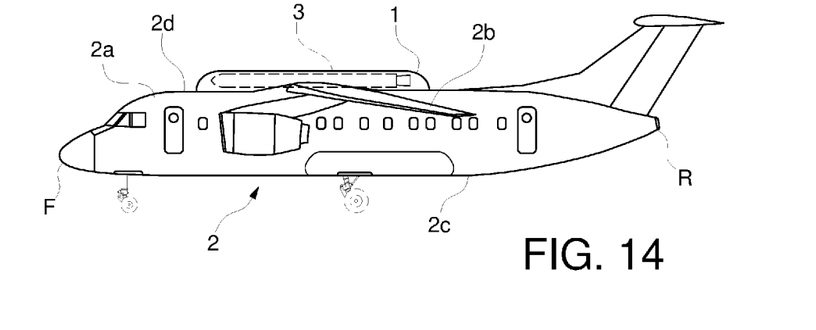
FIG. 14 illustrates a respective aircraft in accordance with the present invention with a casing according to the present invention.

A casing 1 according to the present invention can be constrained, in any suitable way, for example hinged or even partially welded or glued, or connected to a hardpoint through a suitable electromechanical interface, at any point outside the aircraft 2, for example under the belly or portion of the lower wall 2c of the fuselage 2a of the aircraft 2 (see FIGS. 15, 16 and 17), under a wing 2b of the aircraft 2 or above a portion of the upper wall 2d of the fuselage 2a (see FIG. 14).

As it will be possible to ascertain, a casing 1 according to the present invention guarantees a protected transport (from external objects, lightning, etc.) of launch vehicles on an aircraft.

Moreover, owing to the present invention it is possible to obtain a transport of a launch vehicle on an aircraft under specific thermal conditions as well as subjecting it to various controls during the flight impossible to carry out with the solutions according to the prior art.

A casing according to the present invention can also allow landing without gear of a respective aircraft without the need to detach the launch vehicle in advance.

Changes and variants of the invention are possible within the scope defined by the claims.

The invention claimed is:

1. A casing intended to be externally applied, connected or fixed to a fuselage or to a wing or to a central or wing hardpoint of an aircraft, said casing comprising a launch vehicle, wherein said casing entirely or partly delimits a housing zone (HZ) for the launch vehicle, said casing for protecting said launch vehicle during a flight phase of said aircraft, wherein said launch vehicle is a vehicle propelled by rocket engines for sending a payload into space,
further comprising heat-regulation means set to ensure a thermally stable and controlled environment in said housing zone (HZ),
wherein said casing further comprises a release system within said housing zone (HZ) for releasing the launch vehicle, and
wherein said casing further comprises a support means comprising one or more plate components mounted inside the casing or on an internal surface thereof, said one or more plate components comprising one or more recessed resting seats supporting respective sections of the launch vehicle.

2. The casing according to claim 1, wherein said release system includes means for closing-opening said housing zone (HZ), a button or command means or electronic control unit for the opening-closing of the means for closing-opening as well as one or more motors for actuating the means for closing-opening or, alternatively, said means for closing-opening are controlled by gravity or by action of springs or elastic elements.

3. The casing according to claim 2, wherein said closing-opening means comprise doors of bomb-bay type, panels placed in the direction of the wind or counter wind, single or multiple panels, detachable panels or panels which remain fixed to the aircraft and reclose the casing after the launch.

4. The casing according to claim 1, made of materials such to be externally deformed and to internally resist so as to protect the launch vehicle also in case of landing without landing gear of the aircraft.

5. The casing according to claim 1, comprising means for controlling the environmental pressure in said housing zone (HZ).

6. The casing according to claim 1, wherein said support means comprise supports made of plastic or rubber material or in any case of material adapted to minimize the loads transferred to the launch vehicle, uniformly distributed along a lower surface of the housing zone (HZ), or non-uniformly distributed along the housing zone (HZ).

7. The casing according to claim 1, said casing being made of compressible material in order to absorb energy in the case of landing of an aircraft without landing gear, protecting the launch vehicle transported therein in case of failure to release.

8. The casing according to claim 1, comprising at least one sensor for monitoring a state of a launch vehicle contained in said housing zone (HZ).

9. The casing according to claim 1, provided with wings.

10. The casing according to claim 1, further comprising a propulsion apparatus for autonomous flight.

11. The casing according to claim 1, further comprising a parachute for flight or controlled fall.

12. The casing according to claim 1, wherein the heat-regulation means further comprises a sensor for directly or indirectly detecting temperature in the housing zone (HZ) and a heater and/or a cooler to adjust the temperature in the housing zone according to requirements and/or data detected by the sensor.

13. The casing according to claim 1, wherein the support means comprise two or more plate components which are spaced apart and support a front part and a rear part, respectively, of the launch vehicle.

14. The casing according to claim 1, wherein the casing comprises a fixed part which is affixed to the aircraft and one or more hatches movably mounted with respect to the fixed part, wherein the support means are integral with and movable together with said one or more hatches of the casing.

15. An aircraft provided with a main frame or fuselage, with at least one wing and with the casing according to claim 1, said casing being mounted externally on said main frame or fuselage or on said at least one wing or on a central or wing hardpoint of said aircraft and containing the launch vehicle outside said main frame or fuselage or said at least one wing of said aircraft, so as to protect it during an entire flight of said aircraft.

16. The aircraft according to claim 15, wherein the launch vehicle is placed within said housing zone (HZ) defined by said casing or between the casing and a respective external wall section of the fuselage or of a wing or of a central or wing hardpoint of the aircraft.

17. The aircraft according to claim 16, wherein said launch vehicle is a super-orbital, orbital or sub-orbital launch vehicle propelled by engines, wherein such propelled vehicle is the means used to send a payload out of Earth's orbit, on the Earth's orbit or within the zone defined by the Earth's orbit.

* * * * *